US012699112B2

(12) United States Patent
Hashimoto

(10) Patent No.: US 12,699,112 B2
(45) Date of Patent: Aug. 4, 2026

(54) AUTOMATIC ANALYZER, AND DISPENSING METHOD AND PROGRAM THEREOF

(71) Applicant: Canon Kabushiki Kaisha, Tokyo (JP)

(72) Inventor: Shozo Hashimoto, Nasushiobara (JP)

(73) Assignee: Canon Kabushiki Kaisha, Tokyo (JP)

( * ) Notice: Subject to any disclaimer, the term of this patent is extended or adjusted under 35 U.S.C. 154(b) by 507 days.

(21) Appl. No.: 18/318,849

(22) Filed: May 17, 2023

(65) Prior Publication Data

US 2023/0375588 A1     Nov. 23, 2023

(30) Foreign Application Priority Data

May 18, 2022     (JP) .................................. 2022-081880

(51) Int. Cl.
*G01N 35/10*          (2006.01)
*G01N 35/02*          (2006.01)
*G01N 35/04*          (2006.01)

(52) U.S. Cl.
CPC ......... *G01N 35/1067* (2013.01); *G01N 35/02* (2013.01); *G01N 35/1002* (2013.01); *G01N 2035/0401* (2013.01)

(58) Field of Classification Search
CPC .......................... C03B 23/0256; C12Q 1/6837; C12Q 1/6888; C12Q 2600/156;
(Continued)

(56) References Cited

U.S. PATENT DOCUMENTS

| | | | |
|---|---|---|---|
| 11,067,590 B2 | 7/2021 | Konishi et al. | |
| 2013/0122596 A1* | 5/2013 | Kamihara .............. | G16C 20/10 |
| | | | 702/32 |
| 2020/0200784 A1* | 6/2020 | Konishi ............. | G01N 35/1011 |

FOREIGN PATENT DOCUMENTS

| | | |
|---|---|---|
| JP | 561-234336 A | 10/1986 |
| JP | 3-18150 A | 1/1991 |

(Continued)

OTHER PUBLICATIONS

Japanese Office Action dated Mar. 27. 2026, Issued in Japanese Patent Application No. 2022-081880 (with English translation; Documents 18-19 being cited therein).

*Primary Examiner* — Jennifer Wecker

*Assistant Examiner* — Jonathan Bortoli

(74) *Attorney, Agent, or Firm* — Oblon, McClelland, Maier & Neustadt, L.L.P.

(57)                    ABSTRACT

An automatic analyzer includes a transporter, a first dispensing probe, a second dispensing probe, a reagent dispenser, a first reaction container transporter, a fluid dispenser, and a second reaction container transporter. The reagent dispenser is configured to dispense the reagent into the first reaction container at a first dispensing position by the first dispensing probe. The first reaction container transporter is configured to move the first reaction container, from the first dispensing position to a sucking position by the transporter. The fluid dispenser is configured to dispense the fluid including the reagent from the first reaction container at the sucking position into the second reaction container at a second dispensing position by the second dispensing probe. The second reaction container transporter is configured to transport the second reaction container containing the fluid from the second dispensing position to the first dispensing position by the transporter.

17 Claims, 25 Drawing Sheets

(58) Field of Classification Search
CPC ... G01N 2035/0094; G01N 2035/0401; G01N
35/0092; G01N 35/02; G01N 35/025;
G01N 35/1002; G01N 35/1004; G01N
35/1067; G06F 18/23; G16B 20/20;
G16B 20/30; G16B 25/20; G16B 40/30;
G16B 50/00
See application file for complete search history.

(56) References Cited

FOREIGN PATENT DOCUMENTS

| | | | |
|---|---|---|---|
| JP | H06-082460 A | 3/1994 | |
| JP | 2007-212399 A | 8/2007 | |
| JP | 2009-53027 A | 3/2009 | |
| WO | WO 2018/230217 A1 | 12/2018 | |

* cited by examiner

AUTOMATIC ANALYZER, AND DISPENSING METHOD AND PROGRAM THEREOF

CROSS-REFERENCE TO RELATED APPLICATIONS

This application is based upon and claims the benefit of priority from the prior Japanese Patent Application No. 2022-081880, filed on May 18, 2022, the entire contents of which are incorporated herein by reference.

FIELD

Embodiments described herein and illustrated in the drawings relate to an automatic analyzer, and a dispensing method and a program of the automatic analyzer.

BACKGROUND

Automatic analyzers for performing qualitative or quantitative analyses of samples such as blood or urine are known. When an analysis is performed in a two reagent system, a first reagent is dispensed to a reaction container containing a sample. After a predetermined time elapses, a second reagent is dispensed to the reaction container. After a further predetermined time elapses since the second reagent is dispensed, a predefined measurement is performed by a measuring unit. The period of time from the time when the first reagent is dispensed to the reaction container to the time when the second reagent is dispensed to the reaction container, and the period of time from the time when the second reagent is dispensed to the reaction container to the time when the measurement is performed by the measuring unit are determined by an operation cycle of a reaction disk that holds reaction containers and moves the reaction containers to respective dispensing positions or measurement positions. For example, the period of time from the time when the first reagent is dispensed to the reaction container to the time when the second reagent is dispensed to the reaction container may be five minutes, and the period of the from the time when the second reagent is dispensed to the reaction container to the time when the measurement is performed by the measuring unit may be five minutes.

Depending on the type of measurement item, a longer time (for example, 10 minutes) may be needed for the period of time from the time when the second reagent is dispensed to the reaction container to the time when the measurement is performed by the measuring unit. In order to elongate the period of time, the timing at which the second reagent is dispensed to the reaction container may be advanced. However, conventional automatic analyzers have not been able to advance the timing at which the second reagent is dispensed to the reaction container. In order to advance the timing, an additional dispenser may be provided to automatic analyzers. However, in such a case, the entire configuration of the automatic analyzers may become complicated, and the costs for manufacturing such automatic analyzers may be increased.

One of the problems to be solved by the embodiments disclosed herein and the accompanying drawings is to elongate the period of time from the dispensing of a reagent to the completion of measurement in an automatic analyzer. The problems to be solved by the embodiments disclosed herein and the accompanying drawings are not limited to the above-described problem. There may be other problems such as those corresponding to the advantages or effects of the embodiments described below.

DETAILED DESCRIPTION

Embodiments will now be described with reference to the accompanying drawings. The scaling and the ratio between dimensions of an element may be different from those of the actual element in each drawing, for the easy understanding and the convenience of illustration.

Figure 1:
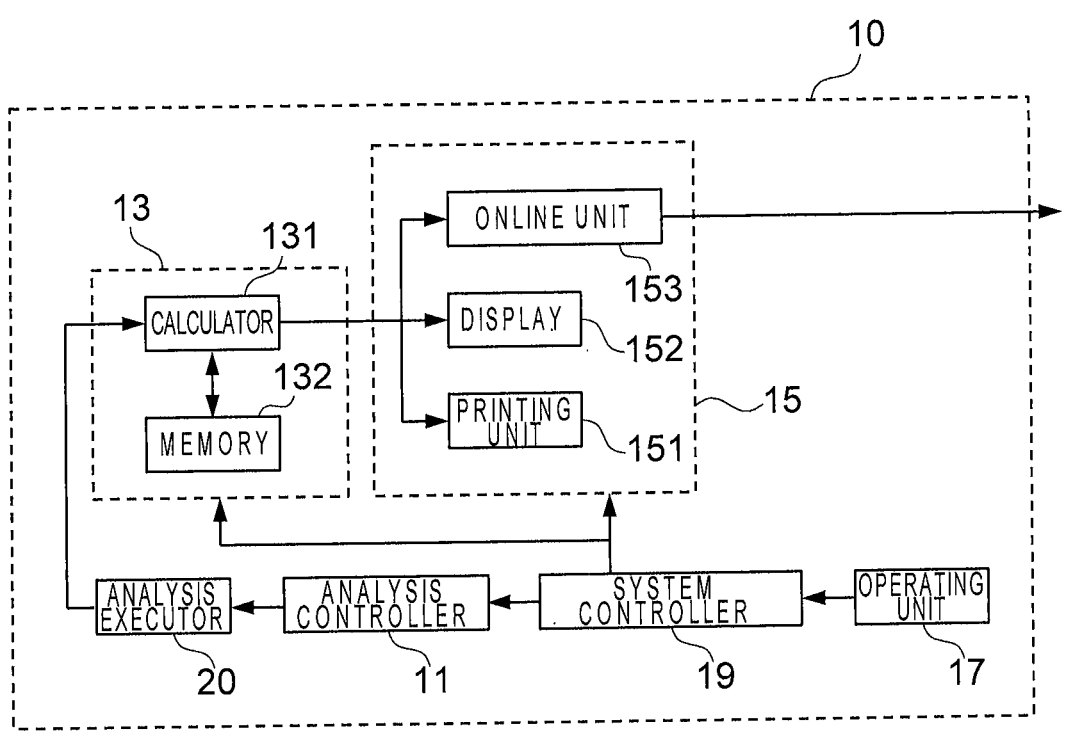
FIG. 1 is a block diagram showing an example of a configuration of an automatic analyzer.
Figure 2:
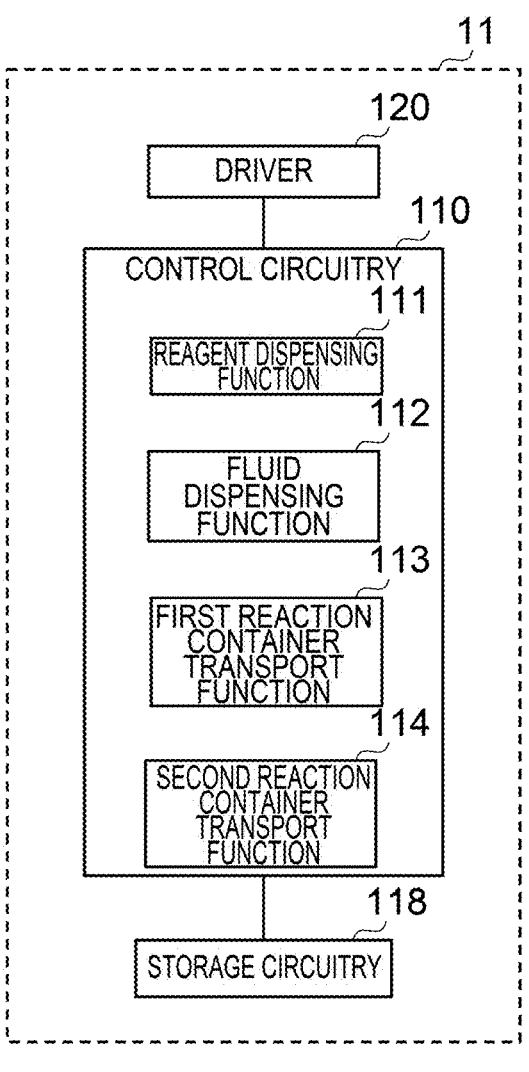
FIG. 2 is a diagram showing an example of functions of an analysis controller of the automatic analyzer.
Figure 3:
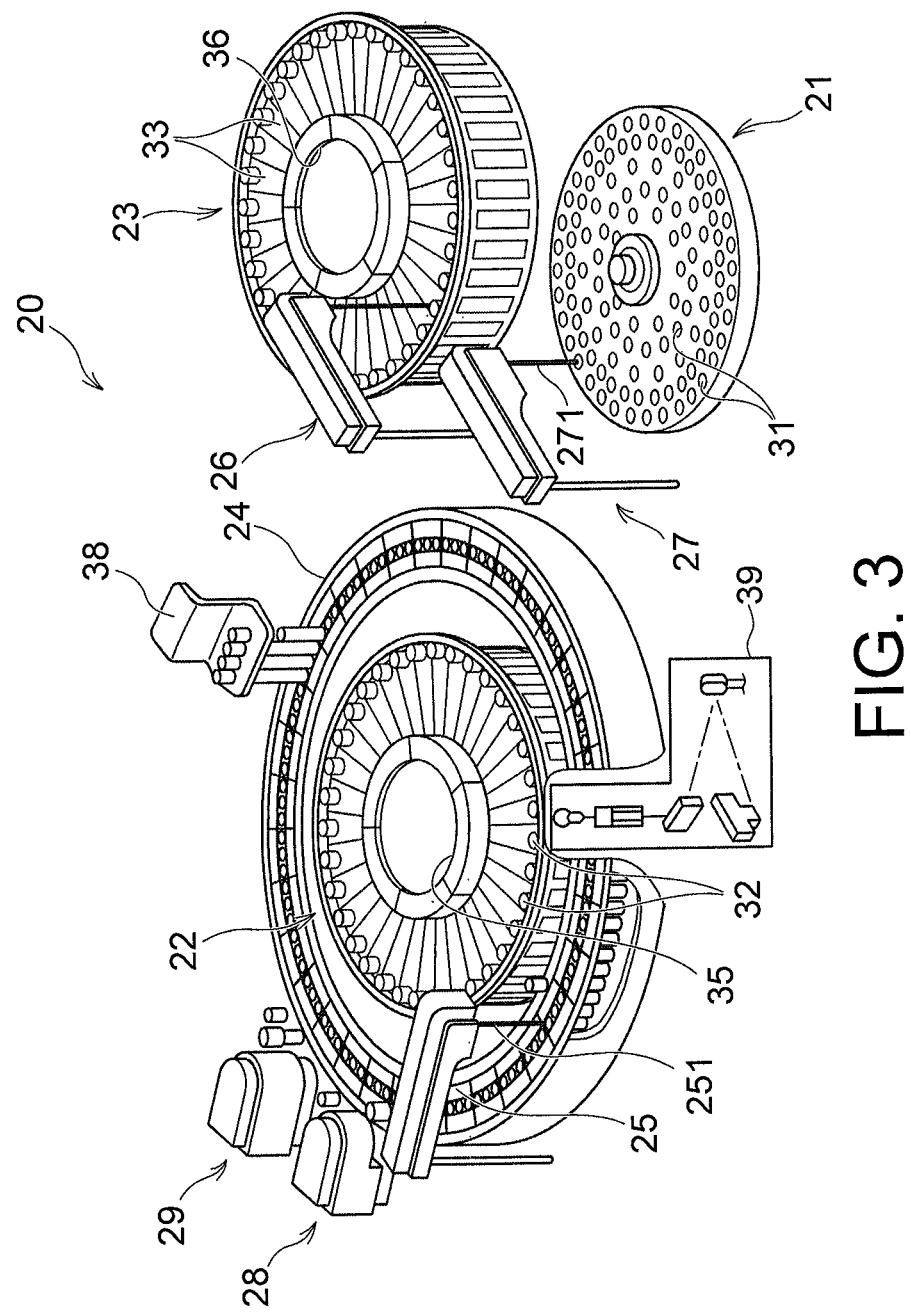
FIG. 3 is a diagram showing an example of a configuration of an analysis executor of the automatic analyzer.

FIG. 1 is a block diagram showing an example of a configuration of an automatic analyzer 10. FIG. 2 is a diagram showing an example of functions of an analysis controller 11 of the automatic analyzer 10. FIG. 3 is a diagram showing an example of a configuration of an analysis executor 20 of the automatic analyzer 10.

The automatic analyzer 10 includes the analysis executor 20, the analysis controller 11, an analysis data processor 13, an output unit 15, an operating unit 17, and a system controller 19. The analysis executor 20 measures and analyzes a sample to be tested and a calibrator. The analysis controller 11 controls the analysis executor 20. The analysis data processor 13 processes an analysis signal outputted from the analysis executor 20 to calculate analysis data. The output unit 15 outputs the analysis data sent from the analysis data processor 13. The operating unit 17 receives inputs of analysis conditions and command signals. The system controller 19 controls the above-described components.

The analysis data processor 13 includes a calculator 131 that produces a calibration table from such signals as a calibration signal and an analysis signal outputted from the analysis executor 20 and calculates analysis data, and a memory 132 that stores the calibration table produced by the calculator 131 and the analysis data calculated by the calculator 131.

The calculator 131 produces a calibration table of each item based on a calibration signal relating to each item outputted from the analysis executor 20, and outputs the calibration table to the output unit 15 and also stores the calibration table in the memory 132. Furthermore, the calculator 131 reads out a calibration table from the memory 132, the calibration table corresponding to an item of the analysis signal outputted from the analysis executor 20, and calculates analysis data using the calibration table and outputs the analysis data to the output unit 15 and also stores the analysis data in the memory 132.

The memory 132 includes a hard disk, for example, and stores the calibration table and the analysis data for each sample to be tested outputted from the calculator 131.

The output unit 15 includes a printing unit 151 that prints and outputs the calibration table and the analysis data outputted from the analysis data processor 13, a display 152 that displays and outputs the calibration table and the analysis data, and an online unit 153 that outputs the analysis data to an external system such as an information system. The printing unit 151 includes a printer, and prints the calibration table and the analysis data outputted from the analysis data processor 13 on a sheet of printing paper based on a predetermined format. The display 152 includes a monitor such as a cathode ray tube (CRT), a liquid crystal display monitor, or an organic EL display monitor, and displays the calibration table and the analysis data outputted from the analysis data processor 13, and also displays a window used for the setting of the analysis conditions as instructed by the system controller 19.

The operating unit 17 includes an input device such as a keyboard, a mouse device, buttons, or a touch panel. As a result of an input, analysis conditions may be set, information of an object to be tested such as the ID and the name of the object to be tested may be inputted, measurement items for each sample to be tested of the object to be tested may be selected, and various operations such as a calibration of each item and an analysis of each sample to be tested may be performed.

The system controller 19 includes a CPU and storage circuitry that are not shown in the drawing. After storing information such as a command signal of an operator supplied from the operating unit 17, analysis conditions, information of the object to be tested, and measurement items of each sample to be tested, the system controller 19 performs the control of the entire system such as the control of the respective components of the analysis executor 20 to operate in a predetermined cycle of a predetermined sequence, and the control relating to the generation of a calibration table and the calculation and output of the analysis data.

The analysis executor 20 analyzes samples. In particular, the analysis executor 20 generates blank data using blank measurement, reference data using reference measurement for measuring a mixed solution including a reference sample for each test item and a reagent used in the analysis for each test item, and test data using measurement of a mixed solution including a sample to be tested and the reagent. The analysis executor 20 includes a sample disk 21, a reagent carousel 22, a reagent carousel 23, a reaction disk 24, a first reagent dispenser 25, a second reagent dispenser 26, a sample dispenser 27, a first agitation mechanism 28, and a second agitation mechanism 29.

The sample disk 21 includes a plurality of sample containers 31, each of which contains a sample 54 such as a reference sample or a sample to be tested, for example blood serum. The sample containers 31 are mounted on a sample rack, for example, and stored in the sample disk 21. One sample rack may have one or more sample containers 31.

The reagent carousel 22 includes a reagent rack 35 that stores a plurality of reagent containers 32 in a rotatable manner. The reagent rack 35 stores and cools a first reagent 51 contained in the reagent containers 32. The first reagent 51 in the reagent containers 32 are of a one-reagent system or two-reagent system, for example, and react with a component of a test item included in the sample 54 such as a reference sample or a sample to be tested. The reagent carousel 23 includes a reagent rack 36 that stores a plurality of reagent containers 33 in a rotatable manner. The reagent rack 36 stores and cools a second reagent 52 contained in the reagent containers 33. Each reagent container 33 thus contains the second reagent 52 that is used with the first reagent 51. The reagent rack 35 may store both the reagent containers 32 containing the first reagent 51 and the reagent containers 33 containing the second reagent 52.

The reaction disk (transporter) 24 has a plurality of fixing tools that are detachably attached on the circumference of the reaction disk 24. The fixing tools hold a plurality of reaction containers 41 to 43 at predetermined intervals on the circumference of the reaction disk 24. Thus, the reaction disk 24 includes the fixing tools for fixing the reaction containers 41 to 43, and holds the reaction containers 41 to 43 in a movable manner.

The first reagent dispenser 25 includes a reagent dispensing probe (first dispensing probe) 251, an arm, and a cleaning pool. The reagent dispensing probe 251 is used for a dispensing operation including a suction of the first reagent 51 in one of the reagent containers 32 stored in the reagent rack 35 and a discharge of the first reagent 51 into the reaction containers 41 to 43 to which the sample 54 is discharged. The arm holds the reagent dispensing probe 251 in a rotatable and vertically movable manner. The cleaning pool is used for cleaning the reagent dispensing probe 251 every time the dispensing from the reagent dispensing probe 251 is finished for one of the reagents.

The second reagent dispenser 26 includes a reagent dispensing probe, an arm, and a cleaning pool. The reagent dispensing probe is used for a dispensing operation including a suction of the second reagent 52 in one of the reagent containers 33 stored in the reagent rack 36, and a discharge of the second reagent 52 into the reaction containers 41 to 43 to which the first reagent 51 is discharged. The arm holds the reagent dispensing probe in a rotatable and vertically movable manner. The cleaning pool is used for cleaning the reagent dispensing probe every time the dispensing of one of the reagents from the reagent dispensing probe is finished.

The sample dispenser 27 includes a sample dispensing probe (second dispensing probe) 271, an arm, and a cleaning pool. The sample dispensing probe 271 is used for a dispensing operation including a suction of the sample 54 in one of the sample containers 31 stored in the sample disk 21, and a discharge of the sample 54 into the reaction containers 41 to 43. The arm holds the sample dispensing probe 271 in a rotatable and vertically movable manner. The cleaning pool is used for cleaning the sample dispensing probe 271 every time the dispensing from the sample dispensing probe 271 is finished for one of the samples 54.

The first agitation mechanism 28 includes an agitator, an arm, and a cleaning pool. The agitator agitates a mixed solution including the sample 54 and the first reagent 51 that have been dispensed into the reaction containers 41 to 43. The arm holds the agitator in a rotatable and vertically movable manner. The cleaning pool is used for cleaning the agitator every time the agitation of the mixed solution is finished.

The second agitation mechanism 29 includes an agitator, an arm, and a cleaning pool. The agitator agitates a mixed solution including the sample 54, the first reagent 51, and the second reagent 52 that have been dispensed into the reaction containers 41 to 43. The arm holds the agitator in a rotatable and vertically movable manner. The cleaning pool is used for cleaning the agitator every time the agitation of the mixed solution is finished.

The automatic analyzer 10 further includes a reaction container cleaner 38 and a measuring unit 39. The measuring unit 39 measures light passing through the reaction containers 41 to 43 containing a fluid such as water or a solution such as a mixed solution. The reaction container cleaner 38 performs a cleaning operation for cleaning and drying the insides of the reaction containers 41 to 43 for which the measuring unit 39 has finished the measurement of the mixed solution. The reaction container cleaner 38 also pours a blank fluid such as pure water to the cleaned reaction containers 41 to 43 for blank measurement.

The measuring unit 39 generates blank data by performing a blank measurement for detecting light passing through the reaction containers 41 to 43 to which the blank fluid has been dispensed. The measuring unit 39 also generates reference data by performing a reference measurement for detecting the light passing through the mixed solution including the reference sample and the reagent in the reaction containers 41 to 43. The measuring unit 39 further generates test data by performing a test measurement on the light passing through the mixed solution including the sample to be tested 54 and the reagents 51 and 52 in the reaction containers 41 to 43.

The analysis controller 11 controls the respective components of the analysis executor 20. For example, the analysis controller 11 sequentially assigns test items to the reaction containers 41 to 43 that have been cleaned through a cleaning operation by the reaction container cleaner 38 before a test is performed. The test items are selected for respective samples to be tested 54 and inputted. The analysis controller 11 then causes the reaction container cleaner 38 to pour a blank fluid to the reaction containers 41 to 43 to which the test items have been assigned. The amount of the blank fluid corresponds to the sum of the amount of the dispensed sample 54 and the amount of the dispensed reagents 51 and 52. Subsequently, The analysis controller 11 causes the measuring unit 39 to perform a blank measurement of the reaction containers 41 to 43 containing the blank fluid, thereby generating blank data.

The analysis controller 11 includes control circuitry 110, storage circuitry 118, and a driver 120. The control circuitry 110 controls the driver 120 to drive the analysis executor 20. The driver 120 includes, for example, a gear, a stepping motor, a belt conveyor system, and a lead screw. For example, the driver 120 separately rotates the sample disk 21, the reagent rack 35, and the reagent rack 36 to move the sample containers 31, the reagent containers 32, and the reagent containers 33. The driver 120 rotatably drives the transporter (reaction disk) 24 to move the reaction containers 41 to 43. The driver 120 also separately drives the respective arms vertically and rotatably to move the first dispensing probe (reagent dispensing probe) 251 and the second dispensing probe (sample dispensing probe) 271.

The storage circuitry 118 stores a program for at least performing a function of the control circuitry 110. In addition to such a program, the storage circuitry 118 may store other programs and information such as data inputted via the operating unit 17, and data generated in the analysis executor 20. The storage circuitry 118 includes a recording medium that can be read by a processor such as a magnetic or optical recording medium, or a semiconductor memory. The storage circuitry 118 is not necessarily formed of a single storage device. For example, the storage circuitry 118 may include a plurality of storage devices.

The control circuitry 110 is a processor that is a main component of the automatic analyzer 10. The control circuitry 110 executes the program stored in the storage circuitry 118 to perform one or more functions corresponding to the executed program. The control circuitry 110 may have a memory region for storing at least a portion of data stored in the storage circuitry 118. As shown in FIG. 2, the control circuitry 110 executes the program stored in the storage circuitry 118 to have, for example, a reagent dispensing function 111, a fluid dispensing function 112, a first reaction container transport function 113, and a second reaction container transport function 114. In the embodiments described below, a single processor performs the reagent dispensing function 111, the fluid dispensing function 112, the first reaction container transport function 113, and the second reaction container transport function 114, but this is not a limited feature. For example, a plurality of independent processors may be combined to form the control circuitry, and the respective functions may be realized by the respective processors executing programs.

In each embodiment described herein, the reagent dispensing function 111 of the control circuitry 110 acts as a reagent dispenser, the fluid dispensing function 112 acts as a fluid dispenser, the first reaction container transport function 113 acts as a first reaction container transporter, and the second reaction container transport function 114 acts as a second reaction container transporter.

The reagent dispensing function 111 controls the first dispensing probe (reagent dispensing probe) 251 to dispense a reagent into a reaction container. For example, when the reagent dispensing function 111 is performed, the control circuitry 110 controls the first dispensing probe 251 to dispense at least one of the first reagent 51 contained in one of the reagent containers 32 and the second reagent 52 contained in one of the reagent containers 33 into at least one of the reaction containers 41 to 43.

The fluid dispensing function 112 controls the second dispensing probe (sample dispensing probe) 271 to dispense a fluid 56 including a reagent into a reaction container. For example, when the fluid dispensing function 112 is performed, the control circuitry 110 controls the second dispensing probe 271 to dispense the fluid 56 including the first reagent 51 from a first reaction container 41 into a second reaction container 42.

The first reaction container transport function 113 controls the transporter (reaction disk) 24 to transport the first reaction container 41. For example, when the first reaction container transport function 113 is performed, the control circuitry 110 controls the transporter 24 to move the first reaction container 41 from a first dispensing position 241 to a sucking position 245. Furthermore, when the first reaction container transport function 113 is performed, for example, the control circuitry 110 controls the transporter 24 to move the first reaction container 41 from a second dispensing position 242 to the first dispensing position 241.

The second reaction container transport function 114 controls the transporter (reaction disk) 24 to transport the second reaction container 42. When the second reaction container transport function 114 is performed, the control circuitry 110 controls the transporter 24 to move the second reaction container 42 from the second dispensing position 242 to the first dispensing position 241.

Embodiments of the disclosure will now be described with reference to the accompanying drawings.

First Embodiment

Figure 4:
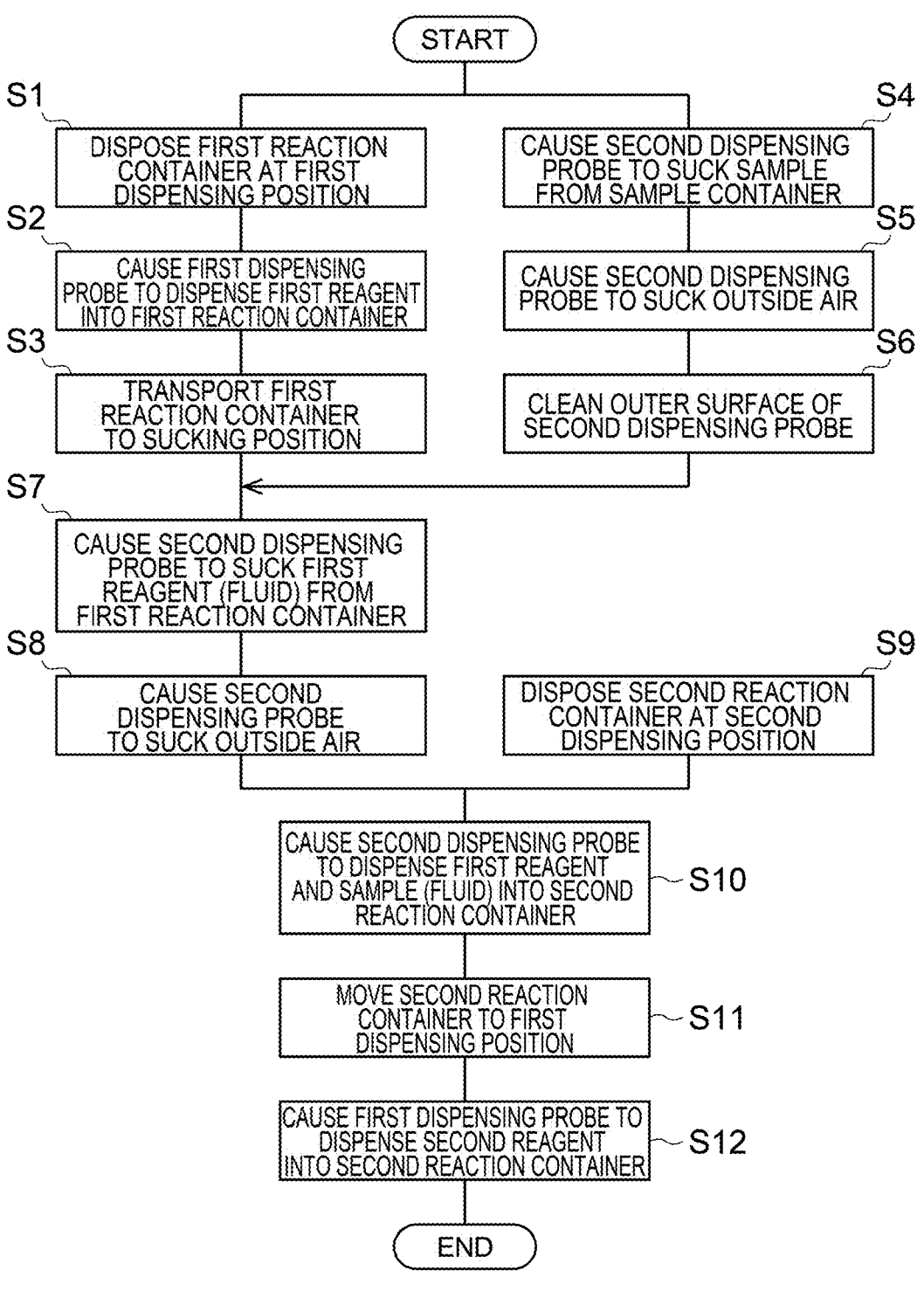
FIG. 4 is a flow chart showing an example of a dispensing method according to a first embodiment.
Figure 5:
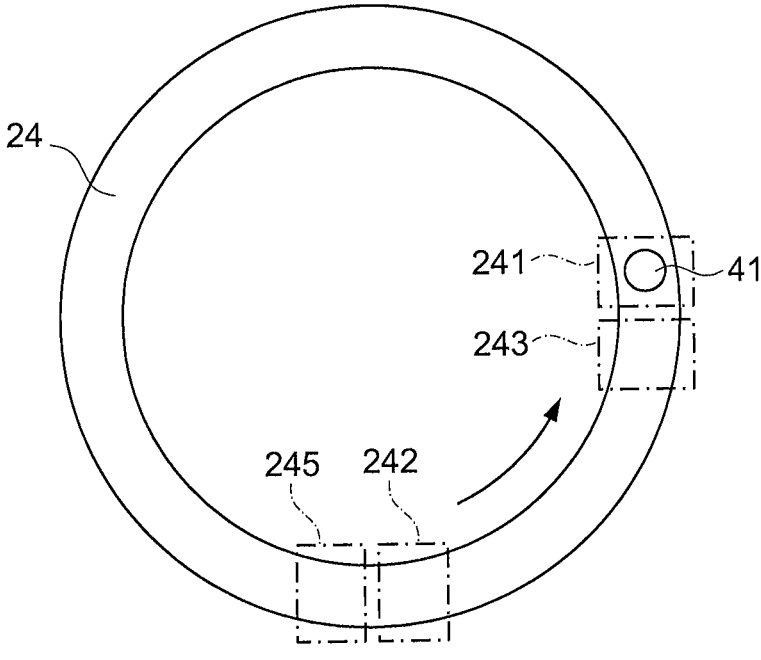
FIG. 5 is a diagram for explaining the transport of a reaction container by means of a transporter of the automatic analyzer according to the first embodiment.
Figure 6:
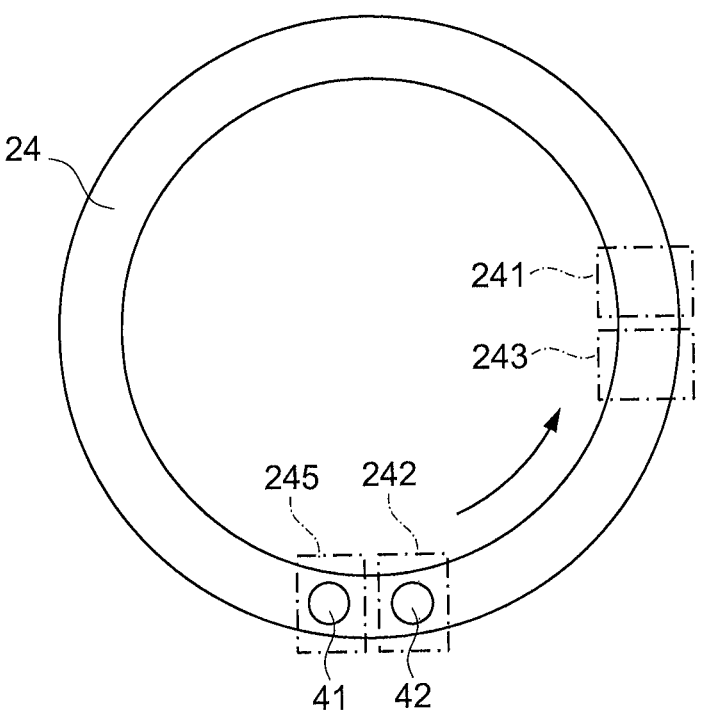
FIG. 6 is a diagram for explaining the transport of the reaction container by means of the transporter.
Figure 7:
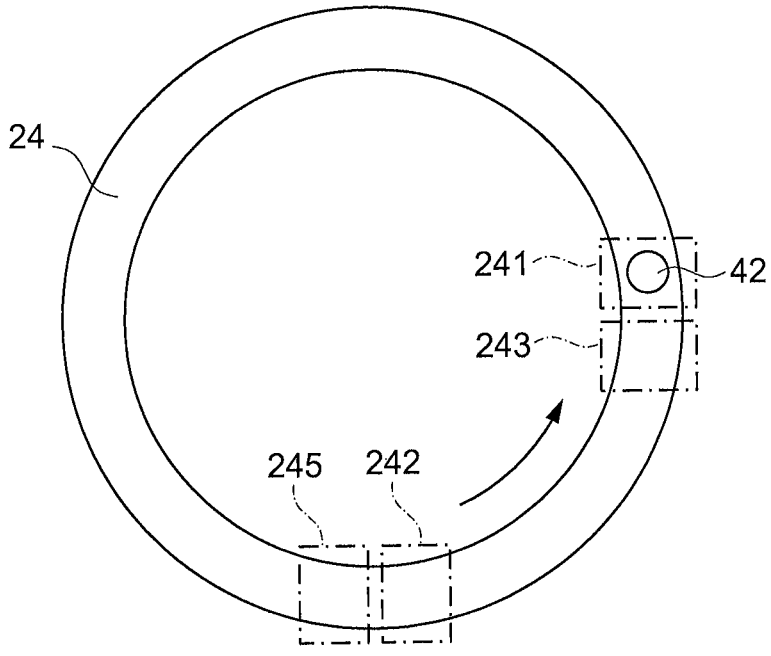
FIG. 7 is a diagram for explaining the transport of the reaction container by means of the transporter.

FIG. 4 is a flow chart showing a dispensing method according a first embodiment. FIGS. 5 to 7 are diagrams for explaining the transport of reaction containers 41 and 42 by means of a transporter (reaction disk) 24 included in an automatic analyzer 10 according to the first embodiment. FIGS. 5 to 7 are plan views viewing the transporter 24 from above. FIGS. 8 to 12 are diagrams for explaining the operation of a second dispensing probe (sample dispensing probe) 271 included in the automatic analyzer 10.

The transporter 24, a first dispensing probe (reagent dispensing probe) 251, and the second dispensing probe (sample dispensing probe) 271 are controlled by control circuitry 110 via a driver 120.

In the first embodiment, a reagent rack 35 of a reagent carousel 22 holds reagent containers 32 containing a first reagent 51 and reagent containers 33 containing a second reagent 52. The first dispensing probe 251 is configured to be able to suck the first reagent 51 and the second reagent 52.

The transporter 24 transports a plurality of reaction containers 41 and 42 in a circumferential direction with a predetermined interval therebetween. In the first embodiment, the transporter 24 may hold the first reaction container 41 and the second reaction container 42. In the illustrated example, the transporter 24 transports the reaction containers 41 and 42 counterclockwise.

A first dispensing position 241, a second dispensing position 242, a third position 243 and a sucking position 245 are set in the transporter 24. At the first dispensing position 241, the reagents 51 and 52 sucked from the reagent containers 32 and 33 by the first dispensing probe 251 of a first reagent dispenser 25 are dispensed into the reaction containers 41 and 42. At the sucking position 245, a fluid 56 is sucked from a first reaction container 41 by the second dispensing probe 271. At the second dispensing position 242, the fluid 56 is dispensed into the second reaction container 42 by the second dispensing probe 271. After one cycle of transport by the transporter 24, the reaction containers 41 and 42 at the sucking position 245 are moved to the third position 243.

The sucking position 245 and the second dispensing position 242 are adjacent to each other in the direction of transport by the transporter 24 (the circumferential direction of the reaction disk 24). In the illustrated example, the second dispensing position 242 is located in a forward direction from the sucking position 245 in the direction of transport by the transporter 24. The location is not limited to the above, and the second dispensing position 242 may be located in a backward direction from the sucking position 245 in the direction of transport by the transporter 24. In the first embodiment, the second dispensing probe 271 is configured to access sample containers 31 held in a sample disk 21, the first reaction container 41 located at the sucking position 245, and the second reaction container 42 located at the second dispensing position 242. The first dispensing position 241 and the third position 243 are adjacent to each other in the direction of transport by the transporter 24. In the illustrated example, the first dispensing position 241 is located in a forward direction from the third position 243 in the direction of transport by the transporter 24.

The transporter 24 rotates about 90 degrees in one cycle, and about 360 degrees in four cycles. However, after the four cycles, the reaction containers 41 and 42 held in the transporter 24 are shifted from the original positions by a pitch of the reaction containers 41 and 42. In the illustrated example, after the four cycles, the reaction containers 41 and 42 held in the transporter 24 are at locations shifted by the pitch of the reaction containers 41 and 42 in the backward direction from the original positions in the direction of transport. Thus, every time four cycles are finished, the positions of the reaction containers 41 and 42 are shifted by the pitch of the reaction containers 41 and 42 along the direction of transport.

In the first embodiment, first, the first reaction container 41 is located at the first dispensing position 241 (step S1, see FIG. 5). Subsequently, at the first dispensing position 241, the first reagent 51 is dispensed into the first reaction container 41 by the first dispensing probe 251 (step S2). In the first embodiment, the dispensing of the first reagent 51 is controlled and performed by the reagent dispensing function 111 of the control circuitry 110.

In more detail, at step S2, first, the first dispensing probe 251 is moved to one of the reagent containers 32 held in the reagent rack 35 of the reagent carousel 22, and sucks a predetermined amount of the first reagent 51 from that reagent container 32. Thereafter, the first dispensing probe 251 is moved to the first reaction container 41 at the first dispensing position 241 (see FIG. 5), and discharges (dispenses) the first reagent 51 into the first reaction container 41. As a result, the first reagent 51 is contained as the fluid 56 in the first reaction container 41. The amount of the first reagent 51 in the first reaction container 41 may be more than the amount needed for one measurement and less than the amount needed for two measurements.

Subsequently, the transporter 24 moves the first reaction container 41 to the sucking position 245 (step S3, see FIG. 6). In the first embodiment, the transport of the first reaction container 41 is controlled and performed by the first reaction container transport function 113 of the control circuitry 110. In the illustrated example, after three cycles, the first reaction container 41 is at the sucking position 245. In parallel with this operation, the second dispensing probe 271 sucks a predetermined amount of sample 54 from one of the sample containers 31.

Figure 8:
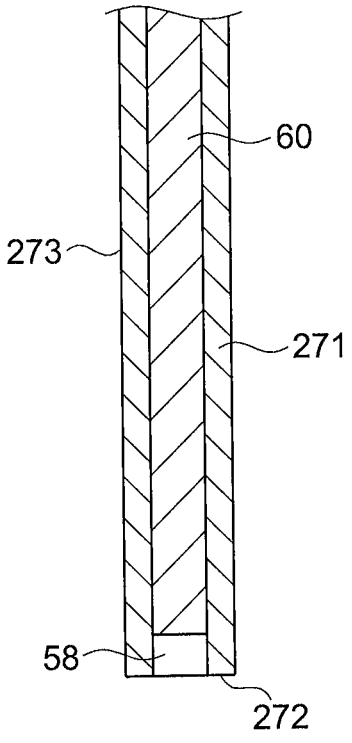
FIG. 8 is a diagram for explaining an operation of a second dispensing probe of the automatic analyzer according to the first embodiment.

In a preparation state, the inside of the second dispensing probe 271 is filled with water 60 such as pure water. First, as shown in FIG. 8, the second dispensing probe 271 sucks the outside air to form an air gap 58 between the water 60 and a tip 272 of the second dispensing probe 271. This prevents the water 60 from dripping from the tip 272 of the second dispensing probe 271. Furthermore, the air gap 58 may prevent the sample 54 from contacting the water 60 and being diluted thereby in the second dispensing probe 271 when the second dispensing probe 271 sucks the sample 54.

Figure 9:
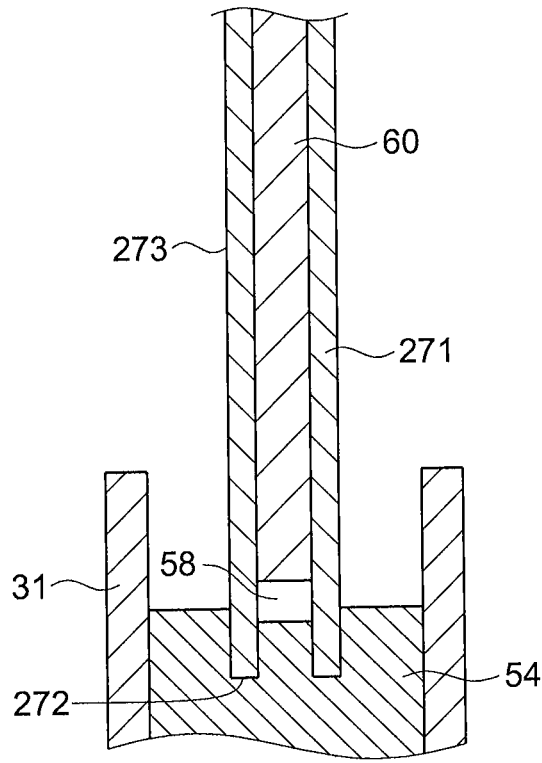
FIG. 9 is a diagram for explaining the operation of the second dispensing probe.

The second dispensing probe 271 is then moved toward and lowered into the sample container 31 held in the sample disk 21 to suck a predetermined amount of sample 54 from the sample container 31 as shown in FIG. 9 (step S4). In the first embodiment, the sucking of the sample 54 is controlled and performed by the fluid dispensing function 112 of the control circuitry 110. At this time, the water 60 may be mixed into the sample 54 in the second dispensing probe 271 and thin the sample 54. Therefore, the amount of the sample 54 to be sucked may be a little greater than the predetermined amount. The excess amount of the sample 54 may be called "dummy."

Figure 10:
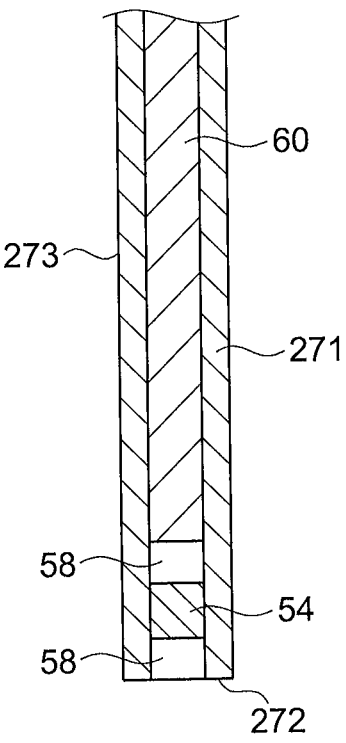
FIG. 10 is a diagram for explaining the operation of the second dispensing probe.

After the sample 54 is sucked, the second dispensing probe 271 is lifted from the sample container 31. Then, as shown in FIG. 10, the second dispensing probe 271 sucks the outside air to form another air gap 58 between the sample 54 and the tip 272 of the second dispensing probe 271 (step S5). This prevents the sample 54 from dripping from the tip 272 of the second dispensing probe 271. In the first embodiment, the sucking of the outside air is controlled and performed by the fluid dispensing function 112 of the control circuitry 110.

After the sample 54 is sucked and before the first reagent 51 is sucked, which will be described later, an outer surface 273 of the second dispensing probe 271 may be cleaned (step S6). This may prevent the sample 54 adhering to the outer surface 273 of the second dispensing probe 271 from dripping. In the first embodiment, the cleaning of the outer surface 273 is controlled and performed by the fluid dispensing function 112 of the control circuitry 110.

Figure 11:
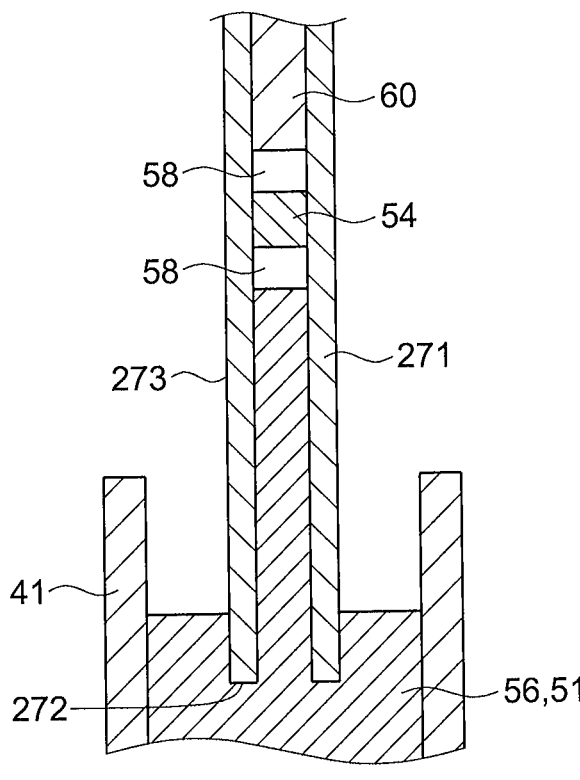
FIG. 11 is a diagram for explaining the operation of the second dispensing probe.

Thereafter, the second dispensing probe 271 containing the sample 54 is moved toward and lowered into the first reaction container 41 at the first dispensing position 241 to suck the fluid 56 (first reagent 51) in the first reaction container 41 as shown in FIG. 11 (step S7). In the first embodiment, the sucking of the fluid 56 is controlled and performed by the fluid dispensing function 112 of the control circuitry 110.

Figure 12:
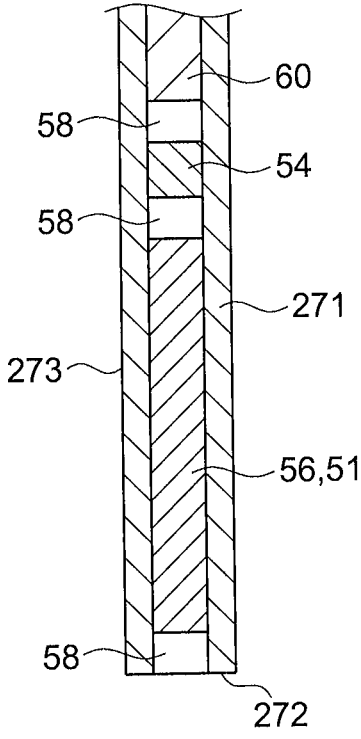
FIG. 12 is a diagram for explaining the operation of the second dispensing probe.

After the fluid 56 is sucked, the second dispensing probe 271 is lifted from the first reaction container 41. Thereafter, as shown in FIG. 12, the second dispensing probe 271 sucks the outside air to form a further air gap 58 between the fluid 56 (first reagent 51) and the tip 272 of the second dispensing probe 271 (step S8). This prevents the fluid 56 from dripping from the tip 272 of the second dispensing probe 271. In the first embodiment, the sucking of the outside air is controlled and performed by the fluid dispensing function 112 of the control circuitry 110. In parallel to steps S7 and S8, the second reaction container 42 is disposed at the second dispensing position 242 (step S9, see FIG. 6).

Subsequently, the second dispensing probe 271 containing the sample 54 and the first reagent 51 is moved toward and lowered into the second reaction container 42 at the second dispensing position 242 to dispense the sample 54 and the first reagent 51 from the second dispensing probe 271 into the second reaction container 42 (step S10). As a result, the sample 54 and the first reagent 51 are contained in the second reaction container 42. In the first embodiment, the dispensing of the sample 54 and the first reagent 51 is controlled and performed by the fluid dispensing function 112 of the control circuitry 110.

After the transport in one cycle is performed by the transporter 24, the reaction container that used to be at the sucking position 245 is disposed to the third position 243, which is shifted by the pitch of the reaction containers 41 and 42 from the first dispensing position 241. Thus, after the transport in one cycle by the transporter 24, the reaction container that used to be at the sucking position 245 is not returned to the first dispensing position 241.

After the transport in one cycle by the transporter 24 from the state shown in FIG. 6, the second reaction container 42 is disposed at the first dispensing position 241 (step S11, see FIG. 7). In the first embodiment, the transport of the second reaction container 42 is controlled and performed by the second reaction container transport function 114 of the control circuitry 110. At the first dispensing position 241, the first dispensing probe 251 dispenses the second reagent 52 into the second reaction container 42 (step S12). As described above, the first dispensing probe 251 is configured to be able to suck the first reagent 51 and the second reagent 52. After sucking the second reagent 52, the first dispensing probe 251 is moved toward the second reaction container 42 at the first dispensing position 241, and discharges (dispenses) the second reagent 52 contained therein into the second reaction container 42. As a result, the second reaction container 42 contains the first reagent 51, the second reagent 52, and the sample 54. In the first embodiment, the dispensing of the second reagent 52 is controlled and performed by the reagent dispensing function 111 of the control circuitry 110.

In the subsequent cycle, the agitation mechanisms 28 and 29 agitate the first reagent 51, the second reagent 52, and the sample 54 in the second reaction container 42, and after a predetermined number of cycles, the measuring unit 39 performs a measurement.

After four cycles (about one revolution) are performed by the transporter 24, the second reaction container 42 that used to be at the first dispensing position 241 is disposed at the third position 243.

The automatic analyzer 10 according to the first embodiment includes the transporter 24 configured to transport the first reaction container 41 and the second reaction container 42, the first dispensing probe 251 configured to dispense the reagent (first reagent) 51, the second dispensing probe 271 configured to dispense the fluid 56 with the reagent 51, the reagent dispenser configured to dispense the reagent 51 into the first reaction container 41 at the first dispensing position 241 by means of the first dispensing probe 251, the first reaction container transporter configured to transport the first reaction container 41, into which the reagent 51 has been dispensed by means of the transporter 24, from the first dispensing position 241 to the sucking position 245, the fluid dispenser configured to dispense the fluid 56 with the reagent 51 from the first reaction container 41 at the sucking position 245 into the second reaction container 42 at the second dispensing position 242 by means of the second dispensing probe 271, and the second reaction container transporter configured to transport the second reaction container 42 containing the fluid 56 from the second dispensing position 242 to the first dispensing position 241 by means of the transporter 24.

In the automatic analyzer 10 according to the first embodiment, the fluid dispenser causes the second dispensing probe 271 to suck the sample 54 from the sample container 31, then suck the reagent 51 from the first reaction container 41 with the sample 54 being contained in the second dispensing probe 271, and then dispense the sample 54 and the reagent 51 into the second reaction container 42.

The reagent dispenser included in the automatic analyzer 10 according to the first embodiment causes the first dispensing probe 251 to dispense the second reagent 52 into the second reaction container 42 that has been transported to the first dispensing position 241 by means of the second reaction container transporter.

A dispensing method of the automatic analyzer 10 according to the first embodiment is a dispensing method of an automatic analyzer including the transporter 24 configured to transport the first reaction container 41 and the second reaction container 42, the first dispensing probe 251, and the second dispensing probe 271, the method including the steps of dispensing the reagent 51 to the first reaction container 41 at the first dispensing position 241 by means of the first dispensing probe 251, transporting the first reaction container 41, into which the reagent 51 has been dispensed, from the first dispensing position 241 to the sucking position 245 by means of the transporter 24, dispensing the fluid 56 including the reagent 51 from the first reaction container 41 at the sucking position 245 to the second reaction container 42 at the second dispensing position 242, by means of the second dispensing probe 271, and transporting the second reaction container 42 containing the fluid 56 from the second dispensing position 242 to the first dispensing position 241 by means of the transporter 24.

A program according to the first embodiment causes the automatic analyzer 10 including the transporter 24 configured to transport the first reaction container 41 and the second reaction container 42, the first dispensing probe 251 configured to dispense the reagent 51, and the second dispensing probe 271 configured to dispense the fluid 56 including the reagent 51 to perform the steps of dispensing the reagent 51 to the first reaction container 41 at the first dispensing position 241 by means of by the first dispensing probe 251, transporting the first reaction container 41, into which the reagent 51 has been dispensed, from the first dispensing position 241 to the sucking position 245 by means of the transporter 24, dispensing the fluid 56 including the reagent 51 from the first reaction container 41 at the sucking position 245 to the second reaction container 42 at the second dispensing position 242 by means of the second dispensing probe 271, and transporting the second reaction container 42 containing the fluid 56 from the second dispensing position 242 to the first dispensing position 241 by means of the transporter 24.

Conventional automatic analyzers dispense a first reagent into a reaction container containing a sample, then dispense a second reagent into that reaction container after about five minutes, and then perform a measurement after a further five minutes. However, depending on the type of measurement item, a longer period of time (for example, 10 minutes) may be preferable between the dispensing of the second reagent into the reaction container and the measurement. In such a case, the timing at which the second reagent is dispensed into the reaction container may be advanced. However, the conventional automatic analyzers have not been able to advance the timing at which the second reagent is dispensed into the reaction container. An additional dispenser may be provided to the conventional automatic analyzers to dispense the second reagent at a timing that is earlier than a predetermined timing. However, this may lead to a complicated configuration of the automatic analyzers and increased costs.

The automatic analyzer 10, and the dispensing method and the program used in the automatic analyzer 10 according to the first embodiment are able to dispense the first reagent 51 into the second reaction container 42 at a timing that is earlier than the timing at which the first reagent 51 is dispensed in the conventional automatic analyzers, and to dispense the second reagent 52 into the second reaction container 42 at a timing that is the same as the timing at which the first reagent 51 is dispensed in the conventional automatic analyzer. Therefore, the period of time between the dispensing of the first reagent 51 and the dispensing of the second reagent 52 in the conventional automatic analyzers may be used for the reaction time of the sample 54 and the reagents 51 and 52 after the dispensing of the second reagent 52. If the period of time between the dispensing of the first reagent 51 and the dispensing of the second reagent 52 is about five minutes and the period of time (reaction time) between the dispensing of the second reagent 52 and the completion of the measurement is about five minutes in the conventional automatic analyzers, the period of time (reaction time) between the dispensing of the second reagent 52 and the completion of the measurement may be elongated to about 10 minutes in the automatic analyzer 10 and the dispensing method and the program for the automatic analyzer 10 according to the first embodiment. Therefore, the period of time between the dispensing of the reagent and the completion of the measurement in automatic analyzers may be elongated. It should be noted that the "five minutes" and "10 minutes" described above are just examples, and the specific periods of time are not limited.

The fluid dispenser included in the automatic analyzer 10 according to the first embodiment causes the second dispensing probe 271 to suck the outside air after sucking the sample 54 and before sucking the reagent 51, to form the air gap 58 between the sample 54 and the reagent 51.

The automatic analyzer 10 according to the first embodiment having the aforementioned features may prevent the sucked sample 54 from dripping from the tip 272 of the second dispensing probe 271.

The fluid dispenser of the automatic analyzer 10 according to the first embodiment cleans the outer surface 273 of the second dispensing probe 271 after the sample 54 is sucked and before the reagent 51 is sucked.

The automatic analyzer 10 according to the first embodiment having the aforementioned feature may prevent the sample 54 adhering to the outer surface 273 of the second dispensing probe 271 from dripping after the sample 54 is sucked by the second dispensing probe 271.

The fluid dispenser of the automatic analyzer 10 according to the first embodiment causes the second dispensing probe 271 to suck the outside air after sucking the reagent 51 to form the air gap 58 between the reagent 51 and the tip 272 of the second dispensing probe 271.

The automatic analyzer 10 according to the first embodiment having the aforementioned feature may prevent the sucked reagent 51 from dripping from the tip 272 of the second dispensing probe 271.

The above-described embodiment may be modified in several ways. Other embodiments will be described below with reference to the drawings. In the following descriptions and the drawings used for supporting the descriptions, elements having substantially the same structures and functions have the same numerical symbols, and the explanations of such elements are not repeated.

Second Embodiment

Figure 13:
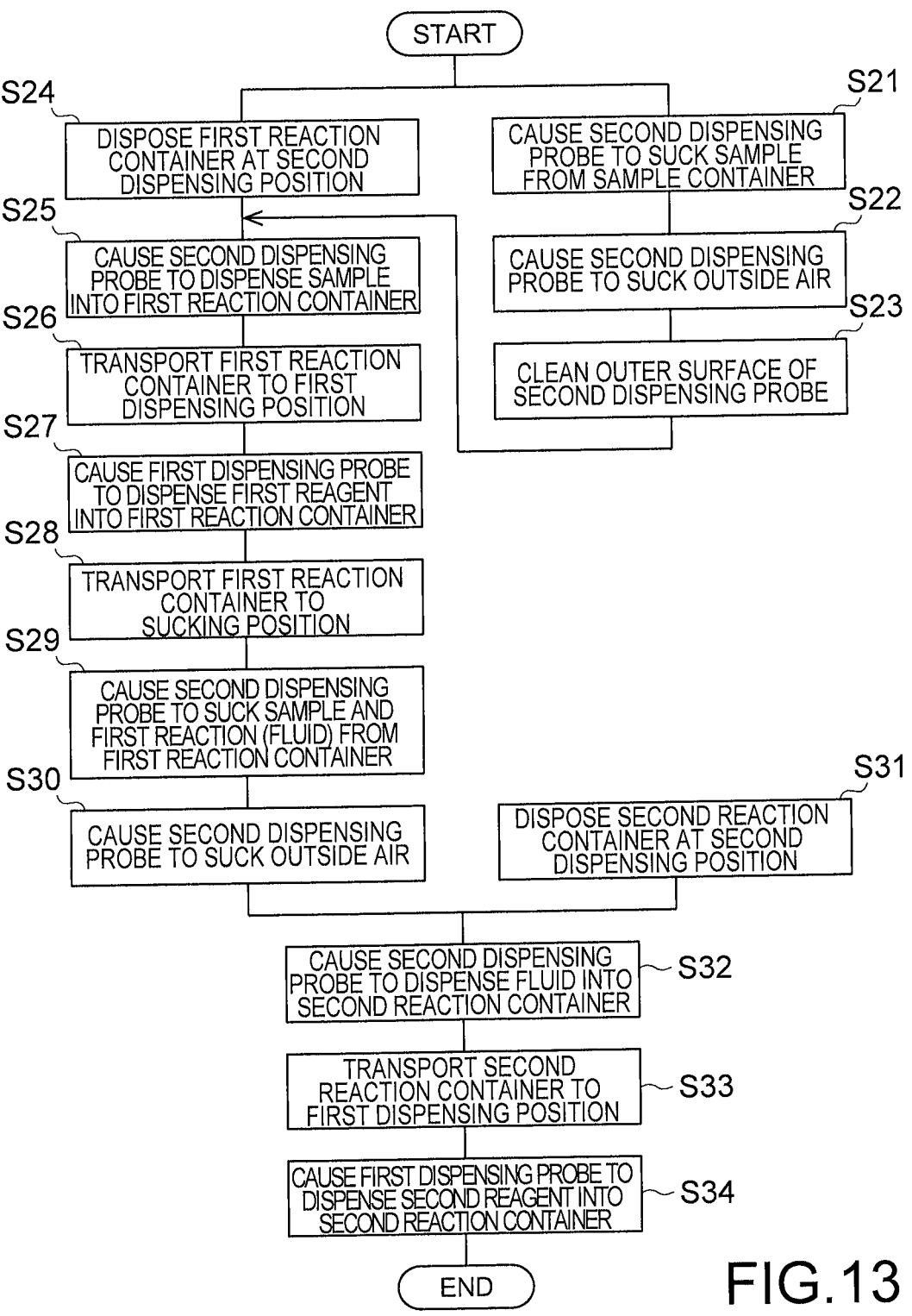
FIG. 13 is a flow chart showing an example of a dispensing method according to a second embodiment.
Figure 14:
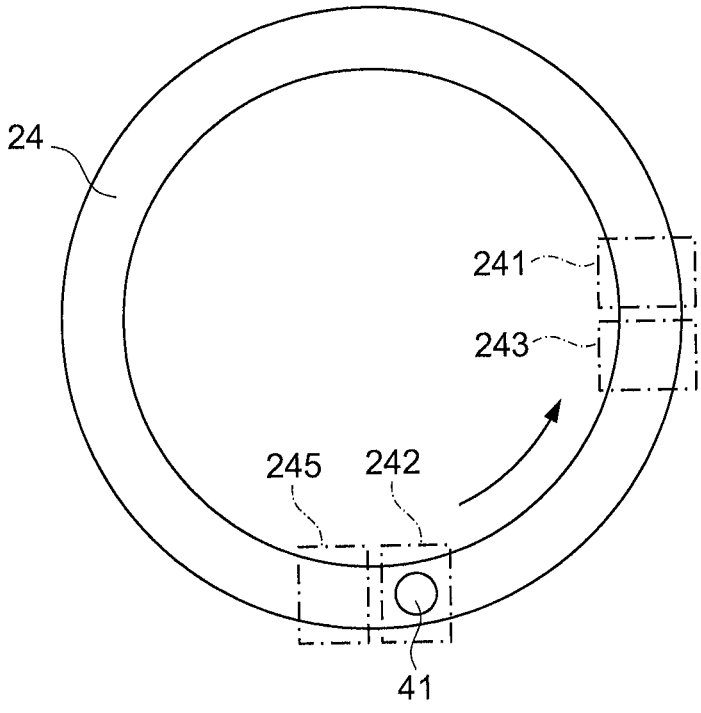
FIG. 14 is a diagram for explaining the transport of a reaction container by means of a transporter of an automatic analyzer according to the second embodiment.
Figure 15:
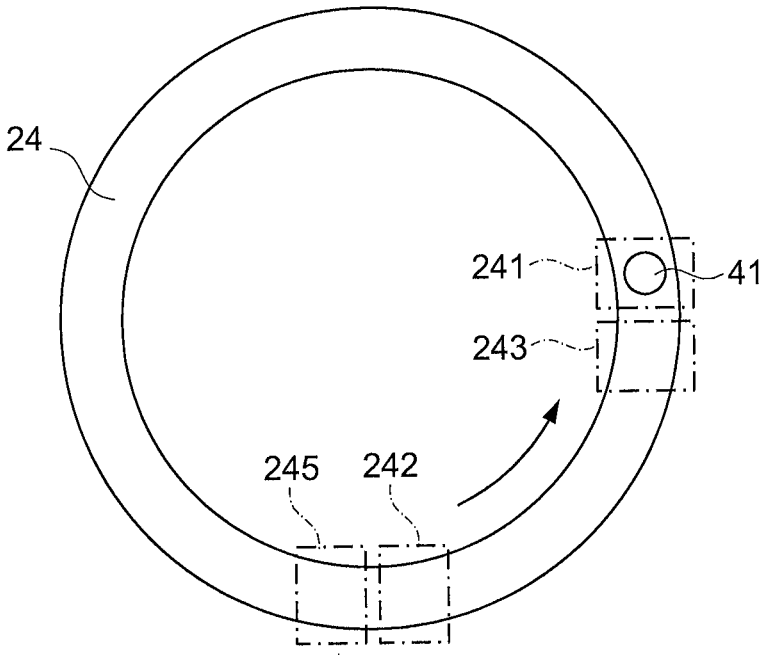
FIG. 15 is a diagram for explaining the transport of the reaction container by means of the transporter.
Figure 16:
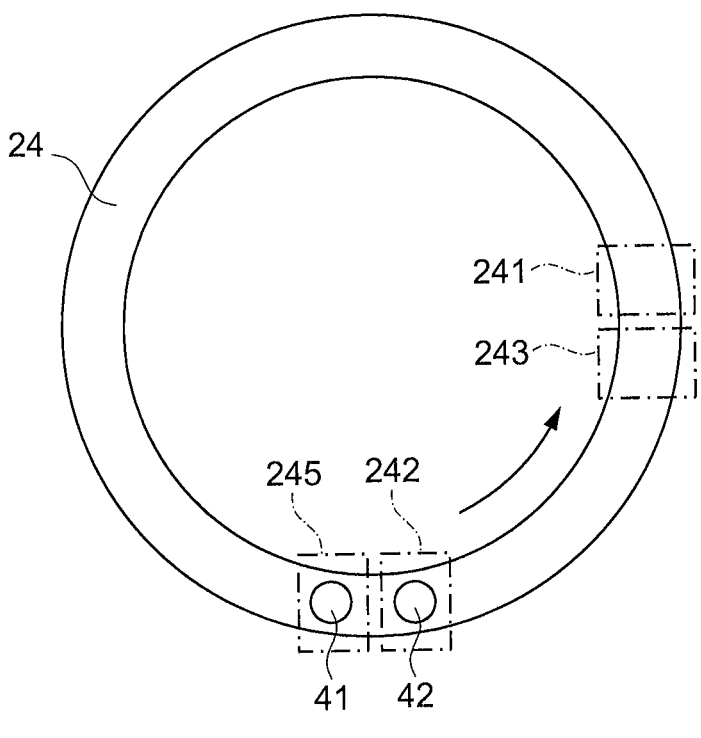
FIG. 16 is a diagram for explaining the transport of the reaction container by means of the transporter.
Figure 17:
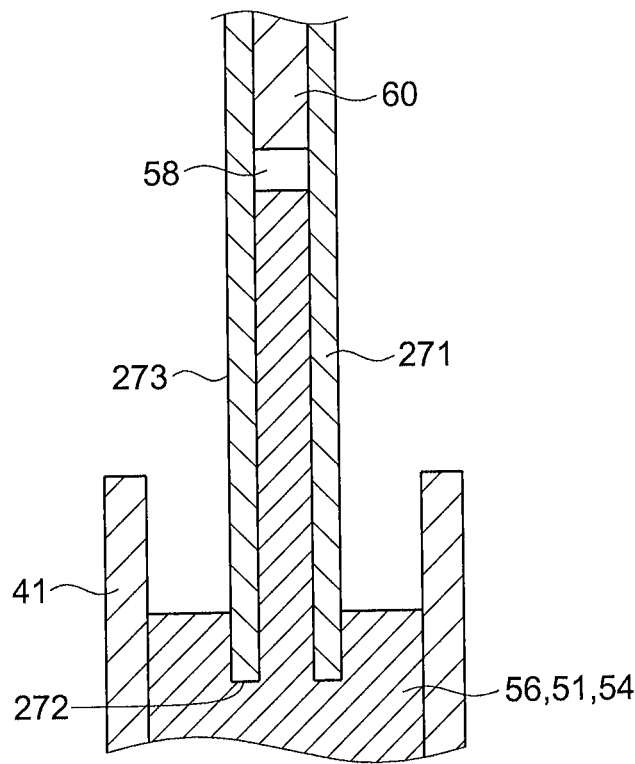
FIG. 17 is a diagram for explaining an operation of a second dispensing probe of the automatic analyzer according to the second embodiment.
Figure 18:
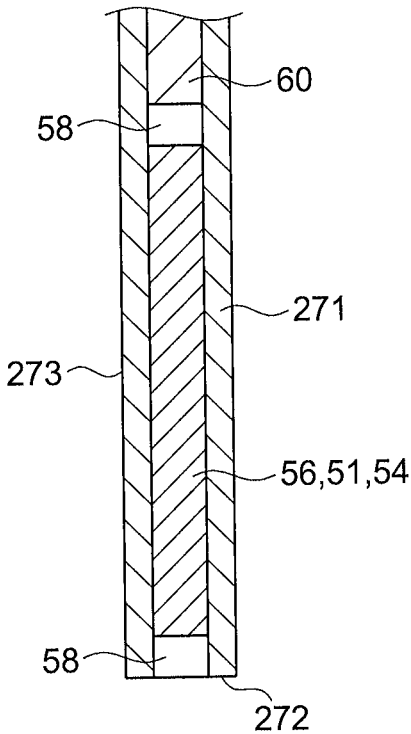
FIG. 18 is a diagram for explaining the operation of the second dispensing probe.

FIG. 13 is a flow chart showing an example of a dispensing method according to a second embodiment. FIGS. 14 to 16 are diagrams for explaining the transport of reaction containers 41 and 42 by means of a transporter 24 of an automatic analyzer 10 according to the second embodiment. FIGS. 14 to 16 are plan views viewing the transporter 24 from above. FIGS. 17 and 18 are diagrams for explaining an operation of a second dispensing probe 271 according to the automatic analyzer 10.

In the second embodiment, first, a sample 54 is dispensed into a first reaction container 41 disposed at a second dispensing position 242 as shown in FIG. 14. Then, a second dispensing probe 271 is moved toward and lowered into a sample container 31 in a sample disk 21 to suck a predetermined amount of sample 54 from the sample container 31 (step S21). In the second embodiment, the sucking of the sample 54 is controlled and performed by the fluid dispensing function 112 of the control circuitry 110. After the sucking of the sample 54, the second dispensing probe 271 is lifted from the sample container 31. Thereafter, the second dispensing probe 271 may suck the outside air to form an air gap 58 between the sample 54 and a tip 272 of the second dispensing probe 271 (step S22). In the second embodiment, the sucking of the outside air is controlled and performed by the fluid dispensing function 112 of the control circuitry 110. After the sucking of the sample 54, an outer surface 273 of the second dispensing probe 271 may be cleaned (step S23). In the second embodiment, the cleaning of the outer surface 273 is controlled and performed by the fluid dispensing function 112 of the control circuitry 110. In parallel to steps S21 to S23, a first reaction container 41 is disposed at a second dispensing position 242 (step S24, see FIG. 14). Thereafter, the second dispensing probe 271 containing the sample 54 is moved toward and lowered into the first reaction container 41 at the second dispensing position 242 to dispense the sample 54 into the first reaction container 41 (step S25). As a result, the sample 54 is contained in the first reaction container 41. In the second embodiment, the dispensing of the sample 54 is controlled and performed by the fluid dispensing function 112 of the control circuitry 110.

After one cycle of transport is performed by a transporter 24, as shown in FIG. 15, the first reaction container 41 is disposed at a first dispensing position 241 (step S26). In the second embodiment, the transport of the first reaction container 41 is controlled and performed by the first reaction container transport function 113 of the control circuitry 110. Thereafter, a first dispensing probe 251 dispenses a first reagent 51 into the first reaction container 41 (step S27). In the second embodiment, the dispensing of the first reagent 51 is controlled and performed by the reagent dispensing function 111 of the control circuitry 110. The dispensing of the first reagent 51 is performed in the same manner as the dispensing of the first reagent 51 in the first embodiment. Therefore, this step is not described in detail.

In a following cycle, agitation mechanisms 28 and 29 agitate the sample 54 and the first reagent 51 to form a fluid 56 including the sample 54 and the first reagent 51. When the transporter 24 transports the first reaction container 41 by a length corresponding to three cycles from the first dispensing position 241, the first reaction container 41 is at a sucking position 245 (step S28, see FIG. 16). In the second embodiment, the transport of the first reaction container 41 is controlled and performed by the first reaction container transport function 113 of the control circuitry 110. The first reaction container 41 at the sucking position 245 contains the fluid 56 including the sample 54 and the first reagent 51.

Thereafter, in the state shown in FIG. 16, the second dispensing probe 271 dispenses the fluid 56 in the first reaction container 41 into the second reaction container 42 at the second dispensing position 242. The second dispensing probe 271 is moved toward and lowered into the first reaction container 41 at the sucking position 245, and sucks the fluid 56 (the sample 54 and the first reagent 51) contained in the first reaction container 41 as shown in FIG. 17 (step S29). In the second embodiment, the sucking of the fluid 56 is controlled and performed by the fluid dispensing function 112 of the control circuitry 110.

After the sucking of the fluid 56, the second dispensing probe 271 is lifted from the first reaction container 41. Thereafter, as shown in FIG. 18, the second dispensing probe 271 sucks the outside air to form an air gap 58 between the fluid 56 and the tip 272 of the second dispensing probe 271 (step S30). This prevents the fluid 56 from dripping from the tip 272 of the second dispensing probe 271. In the second embodiment, the sucking of the outside air is controlled and performed by the fluid dispensing function 112 of the control circuitry 110. In parallel to steps S29 and S30, the second reaction container 42 is disposed at the second dispensing position 242 (step S31).

Subsequently, the second dispensing probe 271 containing the fluid 56 is moved toward and lowered into the second reaction container 42 at the second dispensing position 242 (see FIG. 16) to dispense the fluid 56 from the second dispensing probe 271 into the second reaction container 42 (step S32). As a result, the fluid 56 (with the sample 54 and the first reagent 51) is contained in the second reaction container 42. In the second embodiment, the dispensing of the fluid 56 is controlled and performed by the fluid dispensing function 112 of the control circuitry 110.

After one cycle of transport by the transporter 24 from the state shown in FIG. 16, the second reaction container 42 is disposed at the first dispensing position 241 (step S33, see FIG. 7). In the second embodiment, the transport of the second reaction container 42 is controlled and performed by the second reaction container transport function 114 of the control circuitry 110. At the first dispensing position 241, the first dispensing probe 251 dispenses the second reagent 52 into the second reaction container 42 (step S34). In the second embodiment, the dispensing of the second reagent 52 is controlled and performed by the reagent dispensing function 111 of the control circuitry 110. The dispensing of the second reagent 52 is performed in the same manner as the dispensing of the second reagent 52 in the first embodiment. Therefore, this step is not described in detail.

In a following cycle, agitation mechanisms 28 and 29 agitate the first reagent 51, the second reagent 52, and the sample 54 in the second reaction container 42. After a predetermined number of cycles are finished, a measuring unit 39 performs a measurement.

According to the second embodiment, the reagent dispenser of the automatic analyzer 10 causes the first dispensing probe 251 to dispense the reagent 51 into the first reaction container 41 containing the sample 54, and the fluid dispenser causes the second dispensing probe 271 to dispense the fluid 56 including the sample 54 and the reagent 51 from the first reaction container 41 at the sucking position 245 into the second reaction container 42 at the second dispensing position 242.

Such an automatic analyzer 10 may also be able to dispense the first reagent 51 into the second reaction container 42 at a timing that is earlier than the timing at which the first reagent 51 is dispensed in a conventional automatic analyzer, and to dispense the second reagent 52 into the second reaction container 42 at the same timing as the dispensing of the first reagent 51 in the conventional automatic analyzer. Therefore, the period of time between the dispensing of the first reagent 51 and the dispensing of the second reagent 52 in the conventional automatic analyzer may be used for a reaction time of the sample 54 and the reagents 51 and 52 after the second reagent 52 is dispensed. Thus, the period of time between the dispensing of the reagents and the completion of the measurement in the automatic analyzer 10 may be elongated.

According to the second embodiment, the fluid dispenser of the automatic analyzer 10 causes the second dispensing probe 271 to suck the outside air after sucking the fluid 56 to form an air gap 58 between the fluid 56 and the tip 272 of the second dispensing probe 271.

Such an automatic analyzer 10 may be able to prevent the sucked fluid 56 from dripping from the tip 272 of the second dispensing probe 271.

Third Embodiment

Figure 19:
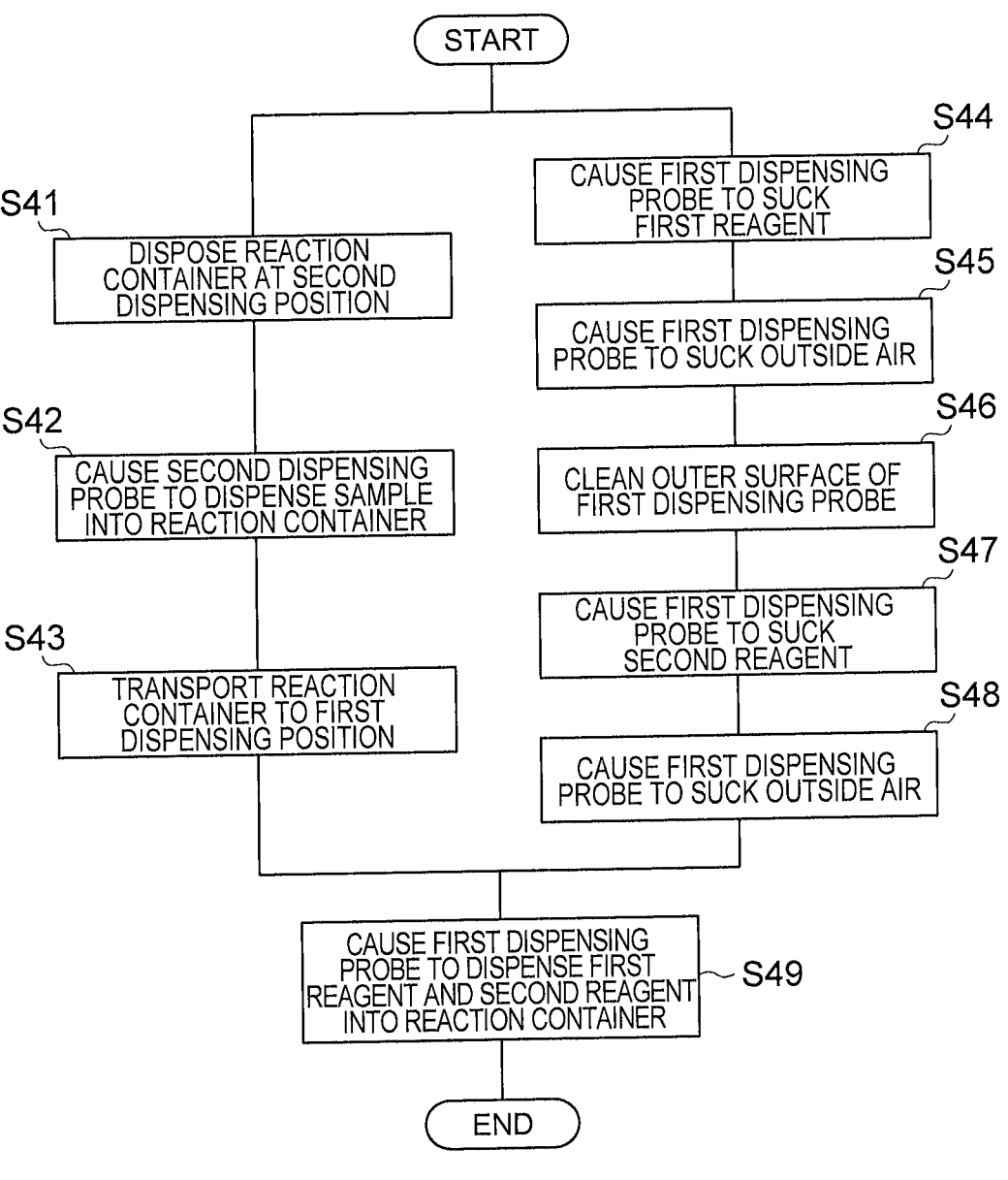
FIG. 19 is a flow chart showing an example of a dispensing method according to a third embodiment.
Figure 20:
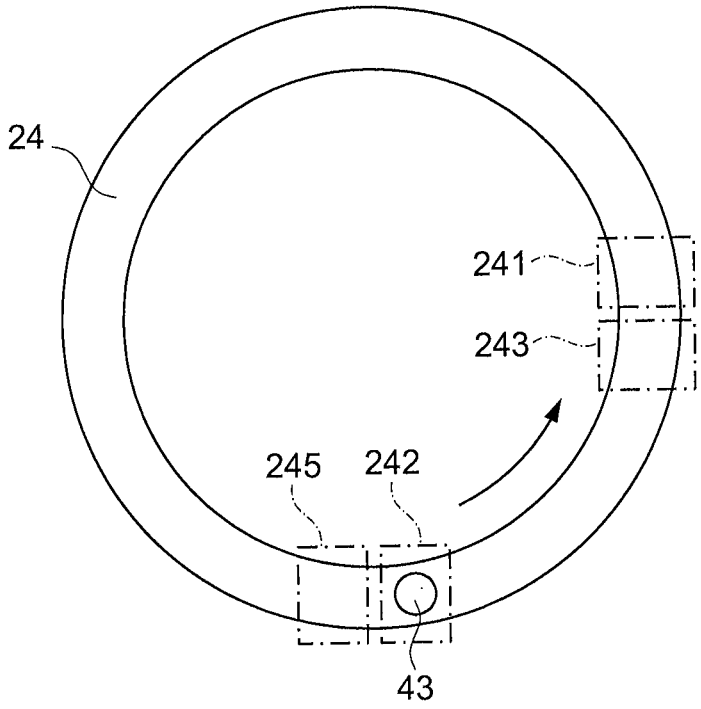
FIG. 20 is a diagram for explaining the transport of a reaction container by means of a transporter of an automatic analyzer according to the third embodiment.
Figure 21:
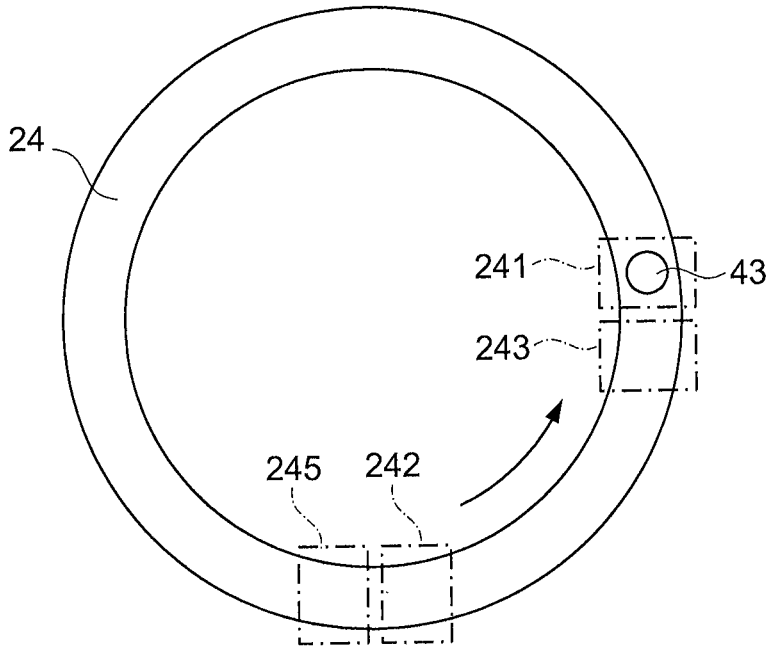
FIG. 21 is a diagram for explaining the transport of the reaction container by means of the transporter.

FIG. 19 is a flow chart showing an example of a dispensing method according to a third embodiment. FIGS. 20 and 21 are diagrams for explaining the transport of a reaction container 43 by means of a transporter 24 included in an automatic analyzer 10 according to the third embodiment. FIGS. 20 and 21 are plan views viewing the transporter 24 from above. FIGS. 22 to 25 are diagrams for explaining the operation of a first dispensing probe 251 of the automatic analyzer 10.

In the third embodiment, at the step corresponding to the dispensing of the first reagent 51 in a conventional automatic analyzer, both a first reagent 51 and a second reagent 52 are dispensed into a reaction container 43. First, the reaction container 43 is disposed at a second dispensing position 242 (step S41, see FIG. 20). Thereafter, in the state shown in FIG. 20, a sample 54 is dispensed into the reaction container 43 at the second dispensing position 242 (step S42). In the third embodiment, the dispensing of the sample 54 is controlled and performed by the fluid dispensing function 112 of the control circuitry 110. The dispensing of the sample 54 may be performed in the same manner as the dispensing of the sample 54 in the second embodiment. Therefore, this step is not described in detail.

Figure 22:
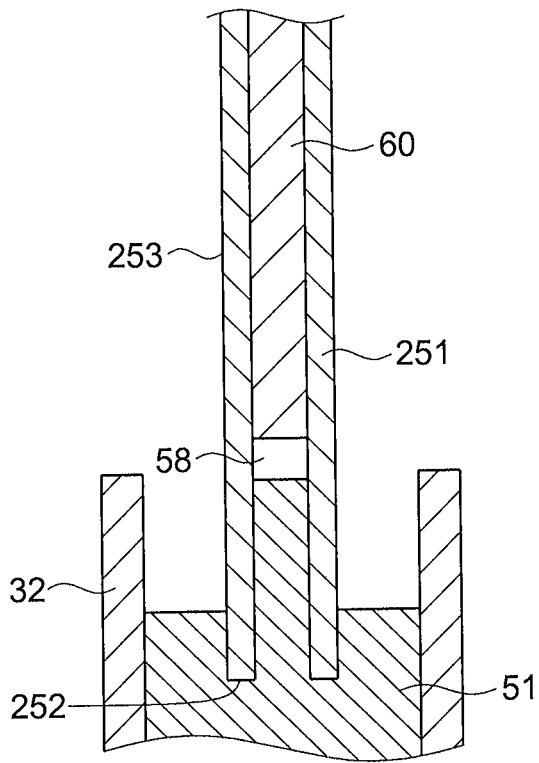
FIG. 22 is a diagram for explaining an operation of a first dispensing probe of an automatic analyzer according to the third embodiment.

After one cycle of transport from the state shown in FIG. 20 by the transporter 24, the reaction container 43 is disposed at a first dispensing position 241 (step S43, see FIG. 21). In the third embodiment, the transport of the reaction container 43 is controlled and performed by the first reaction container transport function 113 of the control circuitry 110. At the first dispensing position 241, the first reagent 51 and the second reagent 52 are dispensed into the reaction container 43 by means of a first dispensing probe (dispensing probe) 251. In more detail, first, the first dispensing probe 251 moves to a reagent container 32 held in a reagent rack 35 of a reagent carousel 22, and sucks a predetermined amount of first reagent 51 from the reagent container 32 as shown in FIG. 22 (step S44). In the third embodiment, the sucking of the first reagent 51 is controlled and performed by the reagent dispensing function 111 of the control circuitry 110. The first reagent 51 may be a material that does not react with the sample 54 and the second reagent 52, namely so-called a dummy reagent.

Figure 23:
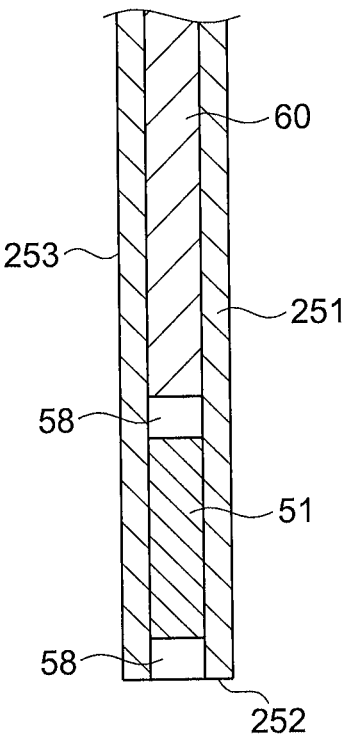
FIG. 23 is a diagram for explaining the operation of the first dispensing probe.

Thereafter, as shown in FIG. 23, the first dispensing probe 251 sucks the outside air to form an air gap 58 between the first reagent 51 and a tip 252 of the first dispensing probe 251 (step S45). This prevents the first reagent 51 from dripping from the tip 252 of the first dispensing probe 251. In the third embodiment, the sucking of the outside air is controlled and performed by the reagent dispensing function 111 of the control circuitry 110.

After the first reagent 51 is sucked and before a second reagent 52, which will be described later, is sucked, an outer surface 253 of the first dispensing probe 251 may be cleaned (step S46). This may prevent the first reagent 51 adhering to the outer surface 253 of the first dispensing probe 251 from dripping, and from mixing into the second reagent 52 in a reagent container 33. In the third embodiment, the cleaning of the outer surface 253 is controlled and performed by the reagent dispensing function 111 of the control circuitry 110.

Figure 24:
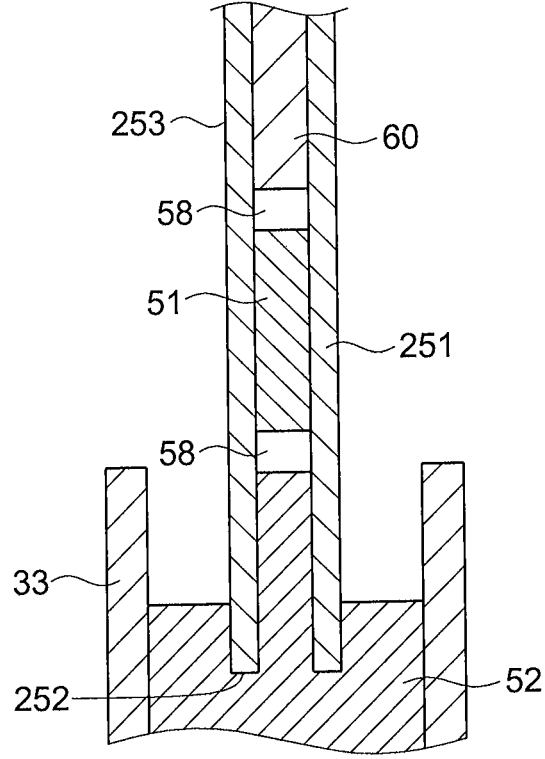
FIG. 24 is a diagram for explaining the operation of the first dispensing probe.

Subsequently, the first dispensing probe 251 containing the first reagent 51 moves toward the reagent container 33 held in the reagent rack 35 of the reagent carousel 22, and sucks a predetermined amount of second reagent 52 from the reagent container 33 as shown in FIG. 24 (step S47). In the third embodiment, the sucking of the second reagent 52 is controlled and performed by the reagent dispensing function 111 of the control circuitry 110.

Figure 25:
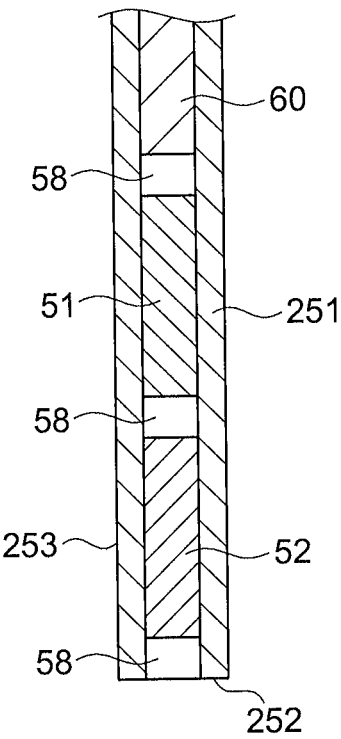
FIG. 25 is a diagram for explaining the operation of the first dispensing probe.

Thereafter, as shown in FIG. 25, the first dispensing probe 251 sucks the outside air to form an air gap 58 between the second reagent 52 and the tip 252 of the first dispensing probe 251 (step S48). This prevents the second reagent 52 from dripping from the tip 252 of the first dispensing probe 251. In the third embodiment, the sucking of the outside air is controlled and performed by the reagent dispensing function 111 of the control circuitry 110.

Thereafter, the first dispensing probe 251 containing the first reagent 51 and the second reagent 52 is moved toward and lowered into the reaction container 43 at the first dispensing position 241 (see FIG. 21) to dispense the first reagent 51 and the second reagent 52 into the reaction container 43 (step S49). As a result, the first reagent 51 and the second reagent 52 are contained in the reaction container 43. In the third embodiment, the dispensing of the first reagent 51 and the second reagent 52 is controlled and performed by the reagent dispensing function 111 of the control circuitry 110. Thus, in the step of dispensing the first reagent 51 in the conventional automatic analyzer, both the first reagent 51 and the second reagent 52 may be dispensed into the reaction container 43. Although the first reagent 51 is sucked by the first dispensing probe 251 before the second reagent 52 in the third embodiment, the way of sucking is not limited thereto, and the second reagent 52 may be sucked by the first dispensing probe 251 before the first reagent 51. When the first reagent 51 and the second reagent 52 are dispensed into the reaction container 43, the reagent that is sucked later by the first dispensing probe 251 contacts the sample 54 in the reaction container 43 earlier. Therefore, one of the first reagent 51 and the second reagent 52 that is desired to first contact the sample 54 in the reaction container 43 may be sucked into the first dispensing probe 251 last.

The automatic analyzer 10 according to the third embodiment includes the dispensing probe 251 configured to dispense the first reagent 51 and the second reagent 52, and the reagent dispenser configured to control the dispensing probe 251 to suck the first reagent 51, then suck the second reagent 52 with the first reagent 51 being contained in the dispensing probe 251, and then dispense the first reagent 51 and the second reagent 52 into the reaction container 43 containing the sample 54.

A dispensing method of the automatic analyzer 10 according to the third embodiment is a dispensing method performed by the automatic analyzer 10 including the dispensing probe 251, the dispensing method including the steps of sucking the first reagent 51 by means of the dispensing probe 251, sucking the second reagent 52 by means of the dispensing probe 251 that contains the first reagent 51, and dispensing the first reagent 51 and the second reagent 52 into the reaction container 43 containing the sample 54 by means of the dispensing probe 251.

A program according to the third embodiment causes the automatic analyzer 10 including the dispensing probe 251 configured to dispense the first reagent 51 and the second reagent 52 to perform the steps of sucking the first reagent 51 by means of the dispensing probe 251, sucking the second reagent 52 by means of the dispensing probe 251 that contains the first reagent 51 therein, and dispensing the first reagent 51 and the second reagent 52 into the reaction container 43 that contains the sample 54 by means of the dispensing probe 251.

Such an automatic analyzer 10 may also be able to dispense the first reagent 51 into the reaction container 43 at a timing that is earlier than the timing at which the first reagent 51 is dispensed in a conventional automatic analyzer, and to dispense the second reagent 52 into the reaction container 43 at the same timing as the dispensing of the first reagent 51 in the conventional automatic analyzer. Therefore, the period of time between the dispensing of the first reagent 51 and the dispensing of the second reagent 52 in the conventional automatic analyzer may be used for a reaction time of the sample 54 and the reagents 51 and 52 after the second reagent 52 is dispensed. Thus, the period of time between the dispensing of the reagents and the completion of the measurement in the automatic analyzer 10 may be elongated.

In the automatic analyzer 10 according to the third embodiment, the reagent dispenser causes the dispensing probe 251 to suck the outside air after sucking the first reagent 51 and before sucking the second reagent 52 to form an air gap 58 between the first reagent 51 and the second reagent 52.

Such an automatic analyzer 10 may be able to prevent the first reagent 51 from dripping from the tip 252 of the first dispensing probe 251 after the first reagent 51 is sucked by the first dispensing probe 251.

In the automatic analyzer 10 according to the third embodiment, the reagent dispenser cleans the outer surface 253 of the dispensing probe 251 after the first reagent 51 is sucked and before the second reagent 52 is sucked.

Such an automatic analyzer 10 may be able to prevent the first reagent 51 adhering to the outer surface 253 of the first dispensing probe 251 from dripping, and from mixing into the second reagent 52 in the reagent container 33.

In the automatic analyzer 10 according to the third embodiment, the reagent dispenser causes the dispensing probe 251 to suck the outside air after sucking the second reagent 52 to form an air gap 58 between the second reagent 52 and the tip 252 of the dispensing probe 251.

Such an automatic analyzer 10 may be able to prevent the second reagent 52 from dripping from the tip 252 of the first dispensing probe 251 after the second reagent 52 is sucked.

The term "processor" in the above descriptions means circuitry such as a central processing unit (CPU), a graphics processing unit (GPU), an application specific integrated circuit (ASIC), a programmable logic device like a simple programmable logic device (SPLD) or a complex programmable logic device (CPLD), and a field programmable gate array (FPGA). If the processor is a CPU, for example, the processor performs a function by reading a program stored in storage circuitry. If the processor is an ASIC, the processor has the function realized as a logic circuit and directly included in the circuitry of the processor instead of being stored in the storage circuitry. The processor of one or more embodiments is not limited to be a single circuit, but may be a combination of a plurality of independent circuits formed as a single processor to perform one or more processing functions. The components shown in FIG. 1 may be implemented to a single processor to perform processing functions.

In the above-described embodiments, the analysis is performed by using two types of reagents, the first reagent 51 and the second reagent 52. However, the analysis may be performed by using three or more reagents in the first to third embodiments. For example, the analysis may be performed by using three agents, the first reagent 51, the second reagent 52, and a third reagent. In this case, for example, the third reagent may be dispensed into the reaction container by using the second reagent dispenser 26 at the timing when the second reagent is dispensed in the conventional automatic analyzer.

While certain embodiments have been described, these embodiments have been presented by way of example only, and are not intended to limit the scope of the inventions. Indeed, a variety of other forms such as omissions, substitutions, changes and combinations may be made in the embodiments without departing from the spirit of the inventions. Such embodiments are intended to be covered by the scope and spirit of the inventions as well as the claimed inventions and their equivalents.

The invention claimed is:

1. An automatic analyzer comprising:
a transporter configured to hold a first reaction container and a second reaction container and to transport the first reaction container and the second reaction container;
a first dispensing probe configured to dispense a first reagent;
a second dispensing probe configured to dispense a fluid including the first reagent; and
processing circuitry configured to:
cause the first dispensing probe to dispense the first reagent into the first reaction container at a first dispensing position,
cause the transporter to transport the first reaction container including the dispensed first reagent from the first dispensing position to a sucking position,
cause the second dispensing probe to dispense the fluid from the first reaction container at the sucking position into the second reaction container at a second dispensing position, and
cause the transporter to transport the second reaction container containing the fluid from the second dispensing position to the first dispensing position.

2. The automatic analyzer according to claim 1, wherein the processing circuitry is further configured to cause the second dispensing probe to suck a sample from a sample container, to suck the first reagent in the first reaction container with the sample being contained in the second dispensing probe, and to dispense the sample and the first reagent into the second reaction container.

3. The automatic analyzer according to claim 2, wherein the processing circuitry is further configured to cause the second dispensing probe to form an air gap between the sample and the first reagent by sucking the sample, sucking outside air after sucking the sample and sucking the first reagent after sucking the outside air.

4. The automatic analyzer according to claim 2, wherein the processing circuitry is further configured to cause a cleaning unit to clean an outer surface of the second dispensing probe after the second dispensing probe sucks the sample and before the second dispensing probe sucks the first reagent.

5. The automatic analyzer according to claim 2, wherein the processing circuitry is further configured to cause the second dispensing probe to form an air gap between the first reagent and a tip of the second dispensing probe by sucking outside air after sucking the first reagent.

6. The automatic analyzer according to claim 1, wherein the processing circuitry is further configured to cause the first dispensing probe to dispense the first reagent into the first reaction container containing a sample, and to cause the second dispensing probe to dispense the fluid including the sample and the first reagent from the first reaction container at the sucking position into the second reaction container at the second dispensing position.

7. The automatic analyzer according to claim 6, wherein the processing circuitry is further configured to cause the second dispensing probe to form an air gap between the fluid and a tip of the second dispensing probe by sucking outside air after sucking the fluid.

8. The automatic analyzer according to claim 1, wherein the processing circuitry is further configured to cause the first dispensing probe to dispense a second reagent into the second reaction container that has been transported to the first dispensing position.

9. A dispensing method of dispensing a fluid using an automatic analyzer including a first dispensing probe, a second dispensing probe and a transporter configured to hold and to transport a first reaction container and a second reaction container, the method comprising:

dispensing a first reagent into the first reaction container at a first dispensing position using the first dispensing probe;

transporting the first reaction container including the dispensed first reagent, from the first dispensing position to a sucking position using the transporter;

dispensing a fluid including the first reagent from the first reaction container at the sucking position to the second reaction container at a second dispensing position using the second dispensing probe; and transporting the second reaction container containing the fluid from the second dispensing position to the first dispensing position using the transporter.

10. The method according to claim 9, further comprising:

sucking a sample from a sample container using the second dispensing probe;

sucking the first reagent in the first reaction container using the second dispensing probe with the sample being contained in the second dispensing probe; and dispensing the sample and the reagent into the second reaction container using the second dispensing probe.

11. The method according to claim 10, further comprising forming an air gap between the sample and the first reagent by sucking outside air after sucking the sample from the sample container using the second dispensing probe and before sucking the first reagent using the second dispensing probe.

12. The method according to claim 10, further comprising cleaning an outer surface of the second dispensing probe after sucking the sample from the sample container using the second dispensing probe and before sucking the first reagent in the first reaction container using the second dispensing probe with the sample contained in the second dispensing probe.

13. The method according to claim 10, further comprising forming an air gap between the first reagent and a tip of the second dispensing probe by sucking outside air after sucking the first reagent in the first reaction container using the second dispensing probe with the sample contained in the second dispensing probe.

14. The method according to claim 9, further comprising:

dispensing the first reagent into the first reaction container containing a sample using the first dispensing probe; and dispensing the fluid including the sample and the first reagent from the first reaction container at the sucking position into the second reaction container at the second dispensing position using the second dispensing probe.

15. The method according to claim 14, further comprising sucking a fluid and forming an air gap between the fluid and a tip of the second dispensing probe using the second dispensing probe by sucking outside air after sucking the fluid.

16. The method according to claim 9, further comprising dispensing a second reagent into the second reaction container using the first dispensing probe after transporting the second reaction container containing the fluid from the second dispensing position to the first dispensing position using the transporter.

17. The automatic analyzer according to claim 1, further comprising a driver configured to drive the transporter rotatably and wherein the transporter has a circumference and comprises a plurality of reaction container holders disposed on the circumference and holding a plurality of reaction containers including the first reaction container and the second reaction container.

* * * * *